United States Patent Office 2,781,783
Patented Feb. 19, 1957

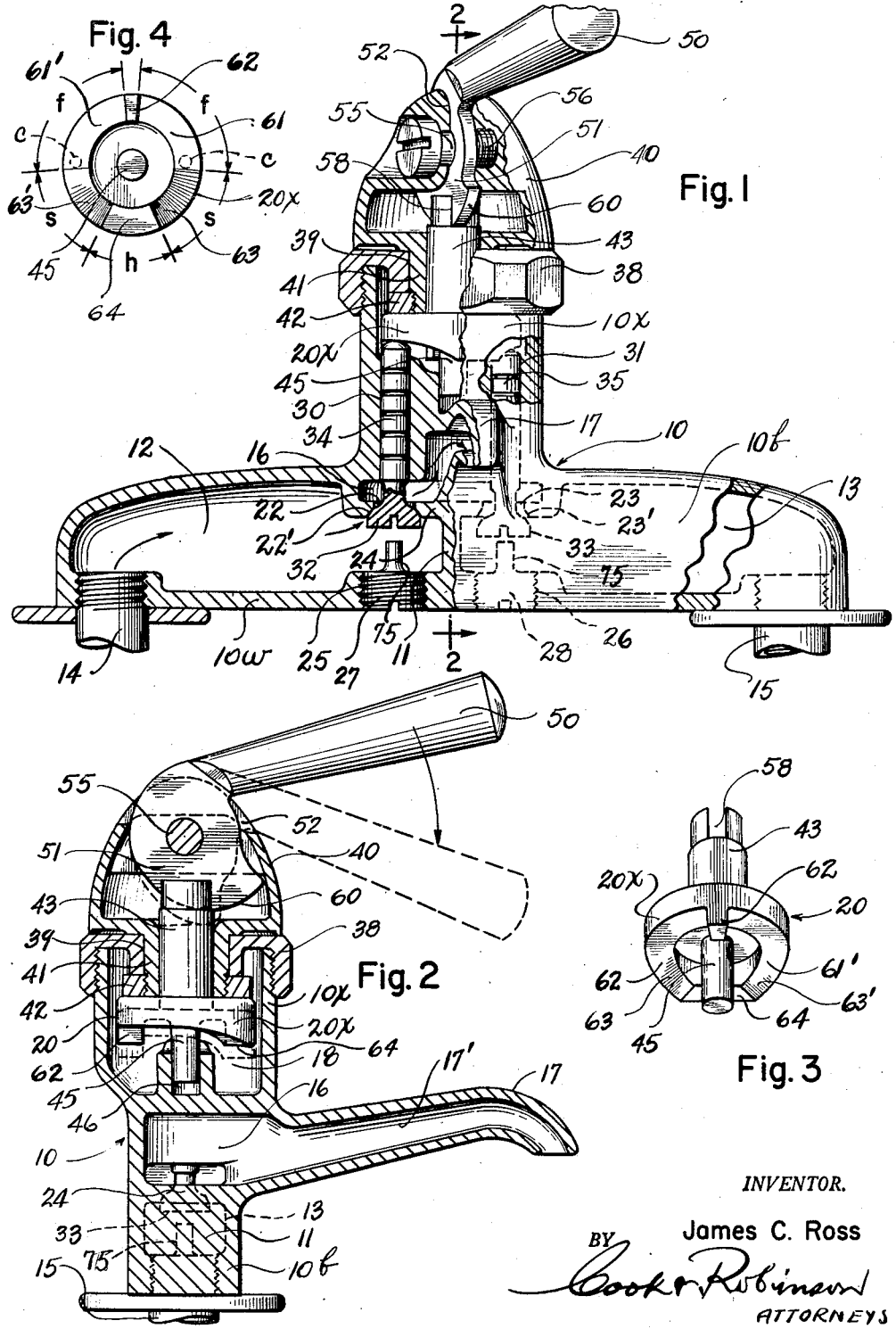

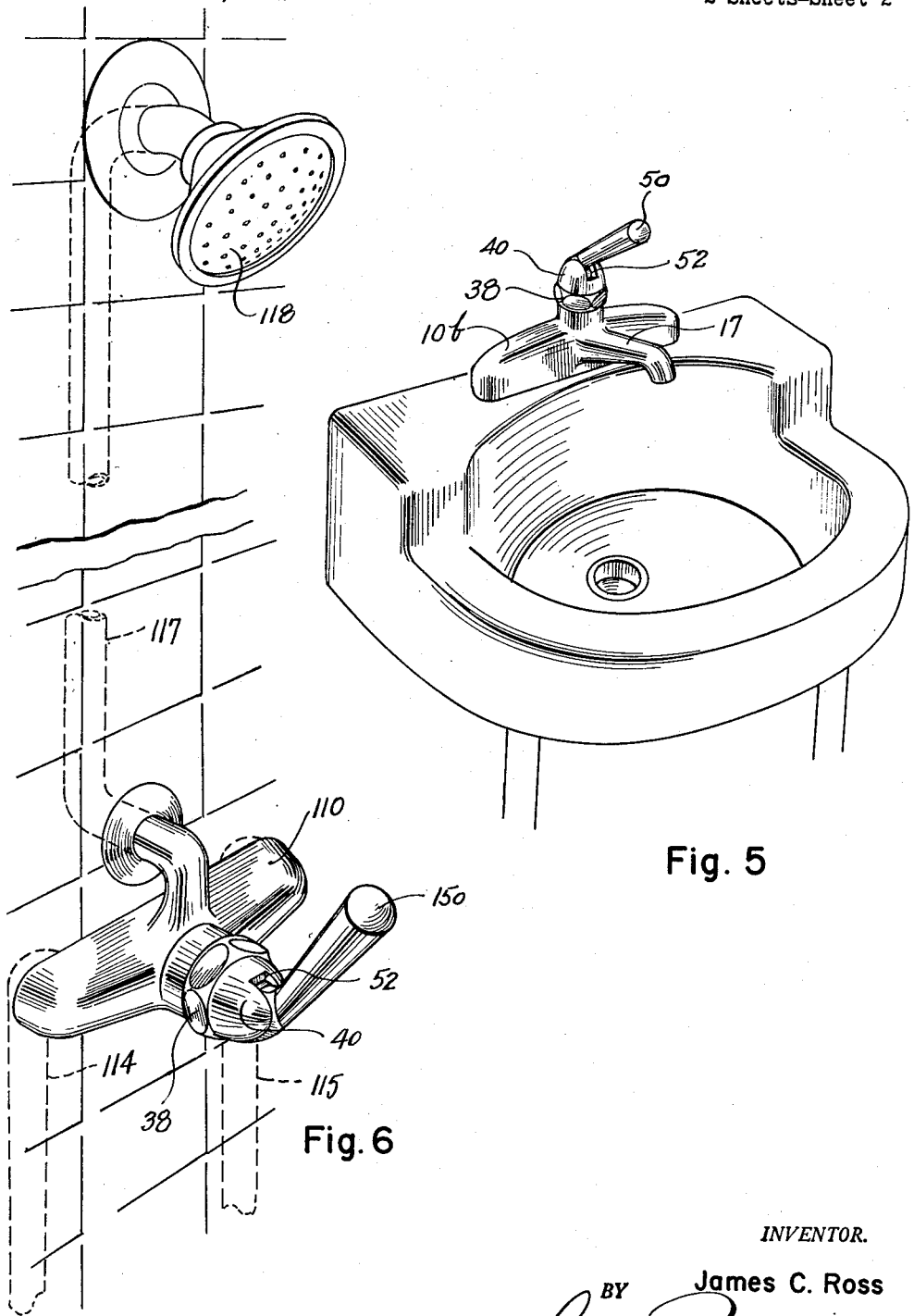

2,781,783

MIXING FAUCETS

James C. Ross, Seattle, Wash.

Application December 15, 1952, Serial No. 326,072

2 Claims. (Cl. 137—636.4)

This invention relates to faucets and it has reference more particularly to what are generally designated as "mixing faucets," and as designed primarily for domestic use with sinks, wash basins and shower baths to control the delivery of hot water and cold water from sources of supply under pressure, and to obtain and regulate the outflow of mixtures of various proportionate amounts of hot and cold water as may be required or desired.

It is the principal object of the present invention to provide a mixing faucet having a single handle or control member that is common to both the hot water and the cold water inlet valves, and whereby both volume and mixture as supplied by the faucet can be adjusted and controlled.

It is a further object of the invention to provide an all metal mixing faucet of the above stated kind, that comprises relatively few moving parts; that is entirely free of springs, washers, packing and gaskets, and which has valves that are non-leaking and are self closing under the pressure of the water they control.

Still another object of the invention is to provide the faucet with a novel circular cam that is common to and adapted for controlling the opening and closing movements of both valves, and which is rotatably adjustable in opposite directions from a neutral setting, to make a selection of hot or of cold water, and to regulate its volume of flow, and which also is movable axially to cause the admittance of cold water with the hot water, or hot water with the cold water thus to obtain a mixture that is of a desired temperature.

Further objects and advantages of the invention reside in the relationship of the valves and cam; in the details of construction of the cam and valves, and in the action of the valves as effected by rotary and vertical adjustment of the cam to control both mixture and volume of hot and cold water.

In accomplishing the above mentioned and other objects, of the invention, I have provided the improved details of construction, the preferred forms of which are illustrated in the accompanying drawings, wherein—

Fig. 1 is a front view of a mixing faucet embodying the improvements of the present invention therein; the housing thereof being shown partly in vertical section to better disclose the relationship of parts contained therein; the valve construction, the position of the valve actuating cam relative to the valve stems and the valve lever for moving the cam.

Fig. 2 is a cross-section through the faucet, taken substantially on line 2—2 in Fig. 1.

Fig. 3 is a perspective view of the valve actuating cam as seen from below.

Fig. 4 is an under side plan view of the cam.

Fig. 5 is a perspective view of the mixing faucet as applied to a wash basin.

Fig. 6 is a view illustrating the adaptation of the present valve mechanism to a shower.

Referring more in detail to the drawings—

The present faucet as seen in Figs. 1 and 2, comprises a cast metal housing that is designated in its entirety by reference numeral 10 and which comprises, as a part thereof, a rather elongated, hollow and horizontally extending base portion 10b. This hollow base portion is interiorly divided by a centrally located vertical partition 11, into two separate chambers, 12 and 13, into which chambers hot and cold water supply pipes, designated at 14 and 15 respectively, are here shown to be threaded. These pipes extend from sources of supply of hot and cold water under pressure.

Integral with the elongated base portion 10b of the housing 10 and intermediate its ends is a cylindrically shaped, upwardly directed housing 10x which, within its lower portion, encloses a mixing chamber 16 that is in direct communication with the discharge channel 17' of a spout 17 that extends forwardly and upwardly from the front side of housing 10x, as seen in Fig. 2.

Formed in the top, or upper end portion of the housing 10x, is a cam chamber 18 within which the valve actuating cam of the present invention is located. This cam, which will presently be described in detail, and which is shown in perspective view in Fig. 3, is designated in its entirety by reference numeral 20.

Opening into the mixing chamber 16 from the hot and cold water chambers 12 and 13, respectively, are ports 22 and 23. These ports are located closely adjacent but at opposite sides of the partition wall 24 that separates the hot and cold water chambers from the mixing chamber 16. These ports are formed with conical, downwardly facing valve seats, designated at 22' and 23'. It is also shown in Fig. 1, that the bottom wall 10w of the housing 10b is formed with threaded openings 25 and 26, that are located in axial alignment with the ports 22 and 23 respectively, and these threaded openings are fitted with removable plugs 27 and 28. Removal of the plugs gives access to the housing 10x for application or removal of the valve members which will presently be described.

Formed vertically in the side wall portions of the housing 10x at opposite sides of its axial line, and parallel thereto, are bored holes 30 and 31. These holes are axially aligned with the tapped openings 25, 26 and also with the ports 22, 23 and they open at lower and upper ends respectively into the chambers 16 and 18.

Fitted to the conical seats 22' and 23' are downwardly opening valves 32 and 33; these being formed at the lower ends of valve stems 34 and 35 that are slidably fitted in the bored holes 30 and 31, and they terminate at their upper ends in spherically rounded surfaces that engage slidably with the valve control cam 20 for its actuation of the valves, as presently explained.

Threaded onto the upper end of the housing 10x, is a bonnet or cap 38, in the form of a nut. This cap has an axial bore 39 therethrough. Applied against the flat top surface of the cap 38, is a hollow and somewhat conically shaped head 40, with a horizontal bottom wall from which a tubular mounting stem 41 extending downwardly and rotatably within the axial bore 39 of the cap. Threaded onto the lower end portion of the stem 41 is a nut 42 whereby the head is rotatably secured in place upon the cap.

The valve actuating cam 20, which is contained in cam chamber 18, has a body portion 20x of circular form, as best shown in Fig. 4, and it is equipped with a coaxial, upwardly extending stem 43 that is rotatably contained within the tubular stem 41 and projects into the lower portion of the hollow head 40. Through the mediacy of the stem 43, the cam can be rotatably adjusted and also moved vertically, as from its full line position to the lower level dotted line position shown in Fig. 2.

It is observed also that the cam 20 has a coaxial, downwardly projecting stem 45 slidably contained in a socket 46 in the bottom wall of chamber 18 as noted in Fig. 2.

For the purpose of effecting the rotary and vertical adjustments of the cam 20, I provide a handle member designated by reference numeral 50. At its inner end the handle 50 is formed in an axial plane thereof with a flattened cam portion 51. This extends downwardly through a slot 52 formed diametrically through the top end of the conical head 40, and into the lower part of the head, where it operatively engages with the upper end of the actuating stem 43 of the cam 20.

The handle is pivotally secured to the head 40 by means of a pivot screw 55 that is extended horizontally into the head, through the cam portion 51 of the handle and is threaded at its end, as at 56, into a solid portion of the head at one side of the slot 52.

It is well shown in Figs. 1 and 2 that the lower part of the cam portion 51 is fitted in a slot 58 formed diametrically through the upper end portion of the stem 43 of cam 20 and therefore provides an operative connection with cam 20 whereby the swinging of the handle from side to side will cause a like rotative movement of the cam. Also, it is well shown in Fig. 2, that the flattened cam forming portion 51, at the mounting end of handle 50, has a peripheral camming surface 60 that is gradually increased in distance from the axis of the pivot bolt 55 and bears in sliding contact with the flat bottom surface of the slot 58. The cam surface 60 is so designed that when the handle is in an upwardly directed position, as seen in full lines in Fig. 2, the cam 20 will be disposed in its upper limit of vertical adjustment. When the handle is swung downward, the cam 51, acting against stem 43 actuates the cam 20 downwardly in accordance with this movement. The full downward movement of cam 20 is as indicated in dotted lines in Fig. 2.

The cam 20 is formed about the under side of its peripheral portion with flat camming surfaces 61 and 61', best shown in Fig. 3. These two camming surfaces start at the same horizontal level, at opposite sides of a downwardly directed stop lug 62 that is integral with the cam and extend in opposite directions through arcs of about 95° at the same horizontal level; these horizontal surfaces being co-extensive with the arcs designated at $f$ and $f$ in Fig. 4. The camming surfaces 61 and 61' then continue from their flat horizontal portions through arcs of about 60°, designated by the arcs $s$ and $s$ in Fig. 4, in gradually downwardly curving surfaces designated at 63 and 63', that merge into opposite ends of a short flat horizontal surface 64 that is diametrically opposite the lug 62 and coextensive with the arc $h$ in Fig. 4.

The normal and neutral position of the cam 20 is that in which it is shown in Fig. 2, with the handle 50 extended upwardly and directly forward. When in this position, the two flat camming surfaces 61 and 61' are engaged by the upper ends of the valve stems 34 and 35 at the locations of the small dotted line circles $c$ and $c$ shown thereon in Fig. 4 and both valves are fully closed. The swinging of the handle 50 toward either side will cause a downwardly curved surface 63 or 63' of the cam to effect a downward movement of the valve 32 or 33, whichever is at that side toward which the handle is swung, and the valve will be opened from the port 22 or 23 in accordance with the extent of movement of the handle, to admit hot or cold water accordingly. When the cam 20 is so turned that its lower level flat portion 64 is caused to ride on the upper end of the stem of an opened valve, there will be no further opening action of that valve and it will merely be held in its "full open" position until the cam is reversely rotated. The cam 20 is limited in its rotation in opposite directions by reason of the stop 62 engaging against the side of the stem of the valve which is then engaged by the flat portion 61 or 61' of the cam.

If it is desired to open both hot and cold water valves simultaneously and to the same extent, the handle 50 is merely pushed directly downward from its neutral position. If it is desired to obtain a mixture of hot and cold water, at any time while only one valve is held partly open by reason of a rotative adjustment of the cam 20, it is only necessary to swing the handle downwardly thus to move cam 20 downward and effect an opening movement of the other valve. Then if the mixture of hot and cold water is not that desired, it can be varied as desired by a rotary movement of the handle that will result in more or less of hot or of cold water to enter.

It is to be understood that, in the present faucet, the valves 32 and 33 are self closing by reason of water pressure acting upwardly against their heads being greater than downward pressure. The upward pressure of water against the valves also operates to hold the cam 20 up against the nut 42. The extent of the downward opening of the valves is limited however, by reason of stems 75 extended upwardly from the upper ends of the plugs 27 and 28 to near the valves.

To insure against leakage along the valve stems they are accurately fitted to their containing bores 30 and 31 and are also circumferentially grooved at close intervals therealong, as shown.

Faucets of this kind are relatively simple in construction; comprise few parts; do not include spring, washers, gaskets or packing and are non-leaking by reason of having valve heads and seats precision ground.

In Fig. 5, I have illustrated a faucet of the present type as applied to a typical wash basin. It is understood that to adapt the faucet to basins of different kinds it is only necessary that the housing 10b be properly equipped with inlets for connection of the hot and cold water pipes. These may enter from below, as in Fig. 1, or from the back side, or even from opposite ends.

In Fig. 6, the structure has been shown as adapted for use in connection with a shower head. As here shown, the valve housing 110 is formed with hot and cold water connections 114 and 115 as previously described, and instead of having a spout 17 as in Fig. 2, it has a pipe connection 117 leading from the housing chamber 16 to a shower head 118.

The handle 150 is adjusted to control the admittance of hot or cold water or a water mixture in the same manner as previously described in connection with the faucet of Figs. 1 and 2.

Having thus described my invention, what I claim as new therein, and desire to secure by Letters Patent, is:

1. A mixing faucet comprising a housing formed with separate pressure chambers for hot and cold water, respectively, a mixing chamber above said pressure chambers and a water sealed cam chamber above said mixing chamber; each pressure chamber having a port opening upwardly therefrom into said mixing chamber and each port having a downwardly facing valve seat therein, a valve fitted to each seat having a vertical actuating stem extended upwardly through the corresponding port and mixing chamber and continuing into the cam chamber, a head mounted on the housing for turning about a vertical axis, a circular cam contained in the cam chamber and having a vertical stem extending axially thereof mounted in said head for rotation on the turning axis of the head and also for vertical movement of the cam along said axis; said cam having camming surfaces operatively engaged with said valve stems and designed for the selective opening and closing of either valve by rotative adjustment of the cam in opposite directions from a neutral position, and by the vertical movement of the cam to open both valves simultaneously; said vertical stem of the cam having an upwardly opening channel directed diametrically through its upper end portion, a hand lever pivotally mounted at one end in said head on a horizontal mounting axis and extended radially therefrom for up and down oscillation, a flat cam head formed on the inner end of said hand lever in the plane of its oscillation, and contained in the upper end channel of the cam mounting stem, and thereby providing an operating connection with the stem whereby the radial swinging of the lever effects a corresponding rotary adjustment of the cam, and whereby up and down oscillation of the lever effects vertical adjustment of the cam accordingly.

2. The combination recited in claim 1 wherein a bonnet is threaded onto the upper end of said housing as a closure for said cam chamber and is formed with an axial bore, and wherein said head is disposed upon said bonnet and is formed with a tubular mounting stem rotatably contained in said axial bore of the bonnet and extended therethrough into the cam chamber, and is secured by a nut threaded onto its inner end, and wherein the mounting stem of said circular cam extends rotatably through said tubular stem into said head, thus providing for removal of the cam, head and lever in their assembled relationship from the housing by the unthreading of the bonnet from the housing.

References Cited in the file of this patent

UNITED STATES PATENTS

| | | |
|---|---|---|
| 692,292 | Jackson et al. | Feb. 4, 1902 |
| 1,024,175 | Boye | Apr. 28, 1912 |
| 1,573,210 | Whidden | Feb. 16, 1926 |
| 1,742,669 | Ross | Jan. 7, 1930 |
| 2,045,308 | Wolff | June 23, 1936 |
| 2,205,684 | Cochran | June 25, 1940 |
| 2,301,439 | Moen | Nov. 10, 1942 |
| 2,452,295 | Elliott | Oct. 26, 1948 |